July 16, 1968  O. E. HALEY  3,392,454
VEHICLE WHEEL CAMBER GAUGE
Filed April 11, 1966  3 Sheets-Sheet 1
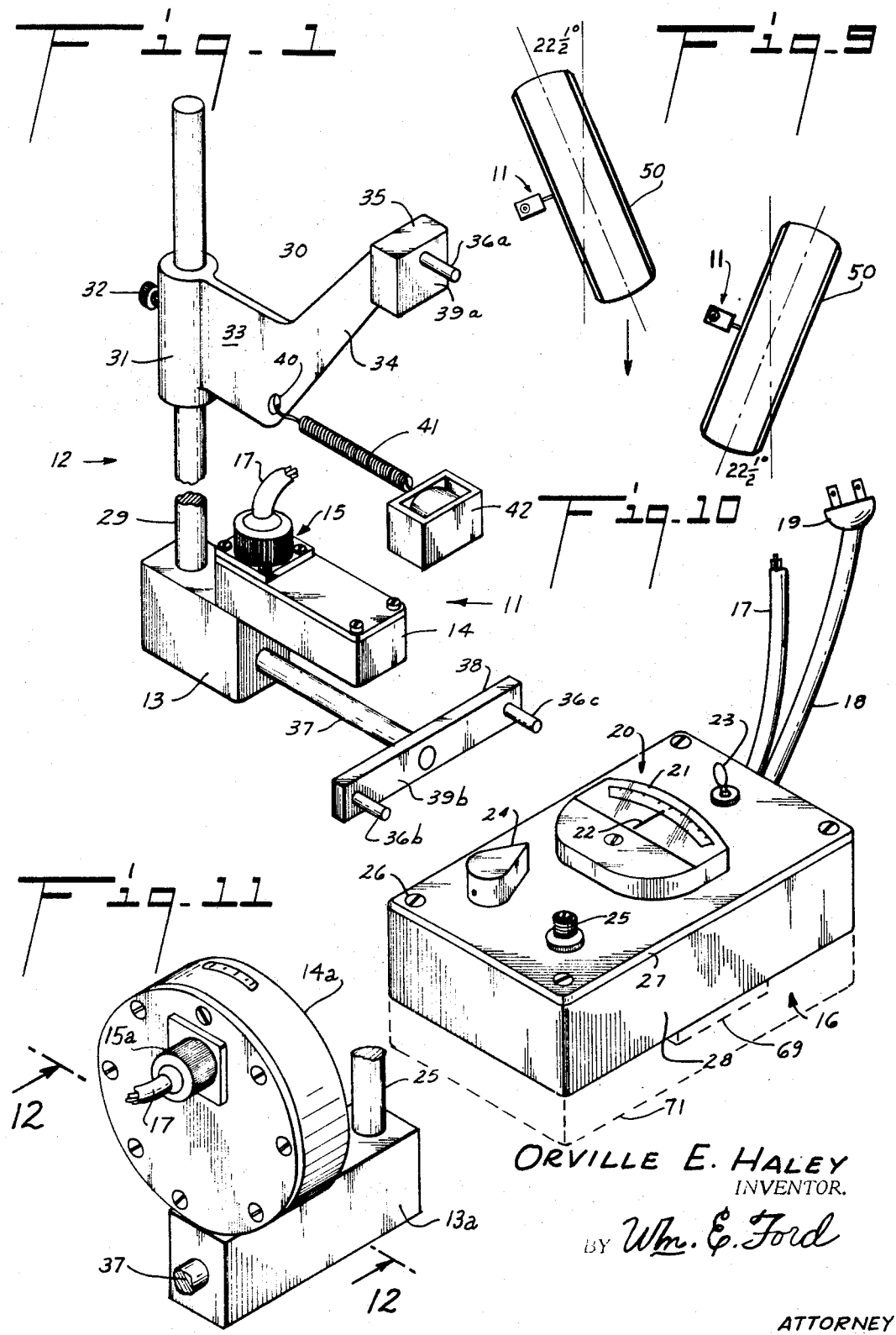
ORVILLE E. HALEY
INVENTOR.
BY Wm. E. Ford
ATTORNEY

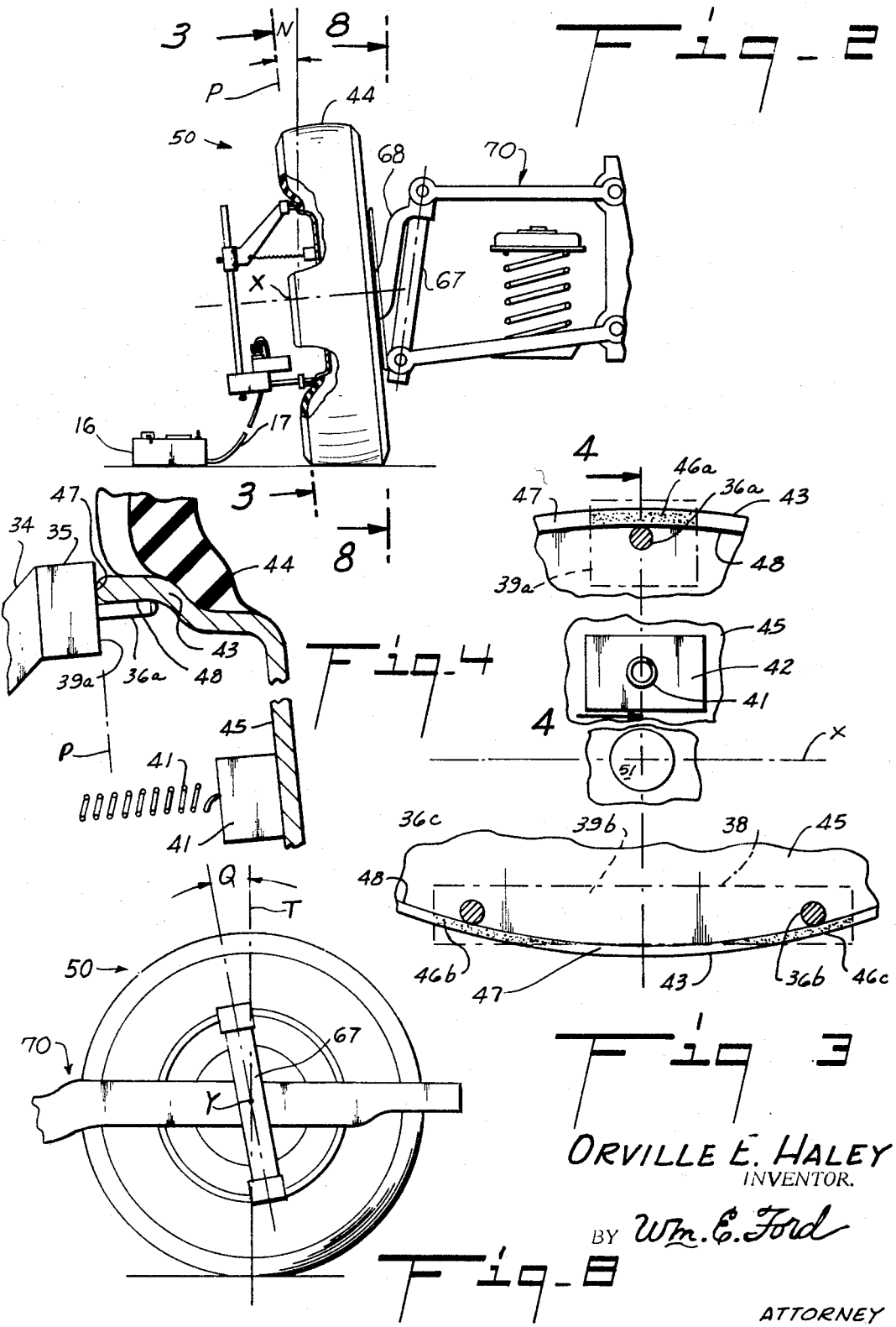

July 16, 1968  O. E. HALEY  3,392,454
VEHICLE WHEEL CAMBER GAUGE
Filed April 11, 1966  3 Sheets-Sheet 3
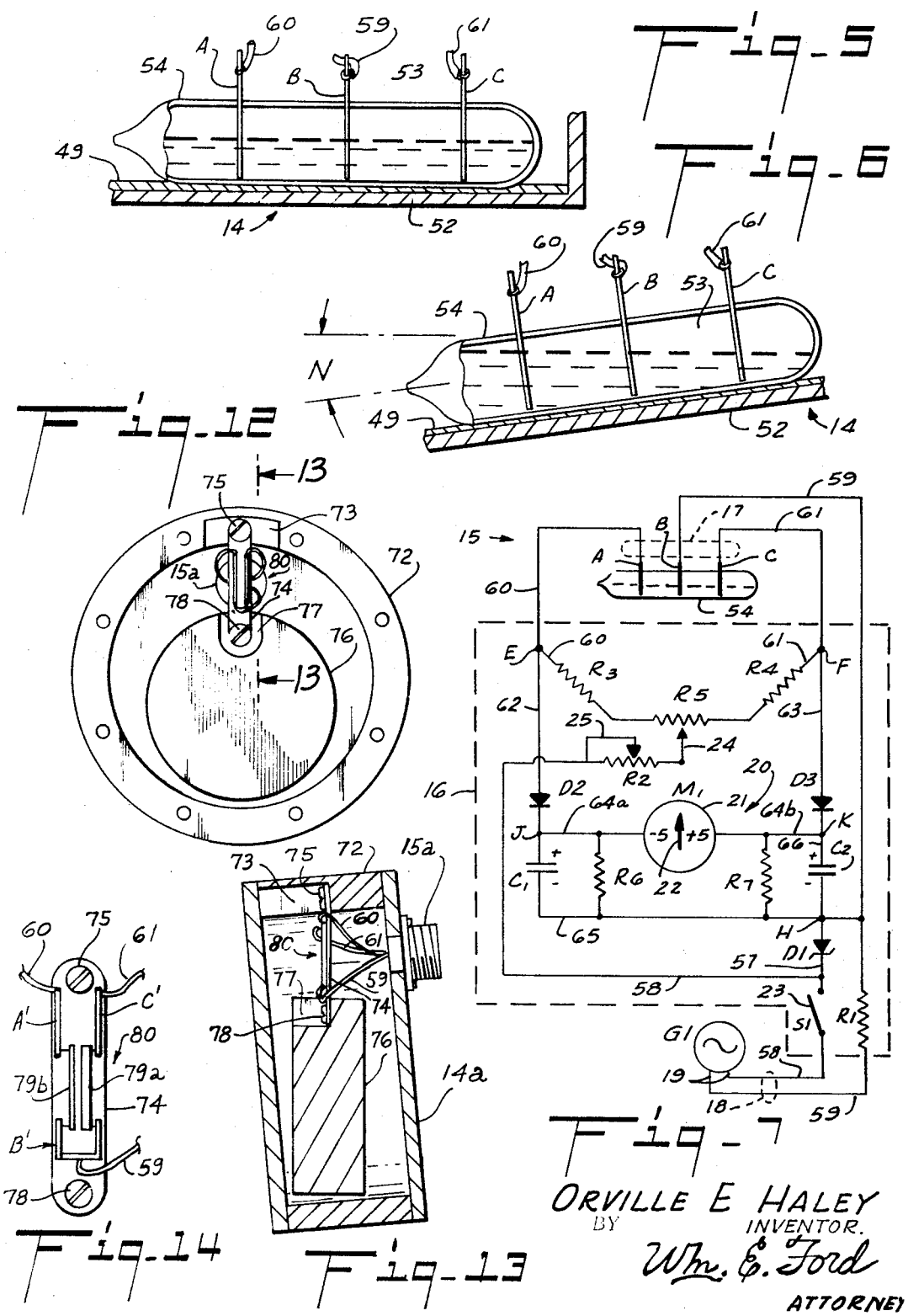
ORVILLE E HALEY
INVENTOR.
BY Wm. E. Ford
ATTORNEY United States Patent Office 3,392,454
Patented July 16, 1968

3,392,454
VEHICLE WHEEL CAMBER GAUGE
Orville E. Haley, Houston, Tex., assignor, by mesne assignments, to Don Seitz, Pasadena, Tex.
Filed Apr. 11, 1966, Ser. No. 541,730
5 Claims. (Cl. 33—203.18)

ABSTRACT OF THE DISCLOSURE

The invention comprises a camber gauge support for in excess of two contact finger means against inner periphery of a wheel rim face in plane of camber; a magnetic means positioned on the wheel center being connected by resilient means to the support which also carries an inclination gauge with circuitry connected by an extension cord to the circuitry of a meter; the meter circuitry also being connected by another extension cord to a source of electrical power. With finger means thus disposed a mechanic can observe the effects of the camber adjustments he makes on respective vehicle parts.

This invention relates to a vehicle wheel camber gauge and, the invention including an inclination gauge adapted to be fitted to, and automatically held against, a wheel in manner that the inclination gauge axis extends in a plane parallel to the tilt of the upper part of the wheel rim inwardly and outwardly about a horizontal axis parallel to the longitudinal axis of the vehicle, the invention also including a portable meter connected by an amply long flexible extension conductor cord to the inclination gauge whereby a workman below the wheel and adjusting the wheel for alignment may observe the adjacently disposed meter for reflected camber readings as he accordingly makes suggested adjustments to align camber and caster.

The invention accordingly has, as a primary object, the provision of a vehicle wheel camber gauge equipped with an inclination gauge adapted to be automatically held against a vehicle wheel in manner that it reflects the camber thereof, a portable meter connected to the inclination gauge by a flexible extension conductor cord being included whereby a workman may adjacently position the meter to observe its indicia in terms of camber reflected from the inclination gauge as he accordingly adjusts the wheel in camber and caster responsive to the meter indicia suggestions.

Other and further objects will be apparent when the specification herein is considered in connection with the drawings, in which:

FIG. 1 is an isometric view of a preferred form of the invention looking frontally and downwardly on the indicating meter and on the camber gauge wheel contacting parts and inclination gauge, and on the supports therefor;

FIG. 2 is an elevational view of an automobile wheel, part in section, with the camber gauge shown in FIG. 1 employed to measure the camber of the wheel, and to remain on the wheel as shown while camber and caster are adjusted;

FIG. 3 is a fragmentary side elevational view, part in phantom, taken along line 3—3 of FIG. 2;

FIG. 4 is a fragmentary sectional elevation taken along line 4—4 of FIG. 3;

FIG. 5 is an elevational view of an electrical level sensing device employed in the gauge housing shown in FIG. 1, the sensing device being shown in horizontal position whereat the electrical impedances, between the central electrode and the electrodes respectively to the left and right hereof, are equal;

FIG. 6 is an elevational view of the electrical level sensing device shown in FIG. 5, as disposed with axis at an angle to the horizontal, whereby the impedance between the center and left electrode is less, and voltage greater, while the impedance between the center and right electrode is greater, and the voltage less;

FIG. 7 is an electrical diagram showing circuitry employed with the sensing device shown in FIGS. 5 and 6, the same circuitry being applicable in the use of the sensing device for the form of invention shown in FIGS. 11–14, inclusive, to be hereinbelow described;

FIG. 8 is an elevational view, partially diagrammatic, as taken along line 8—8 of FIG. 2, to indicate the wheel caster angle;

FIGS. 9 and 10 are plan views showing a wheel after being rotated 22½ degrees in respective opposite directions (toward left and right turns) from the wheel position shown in FIG. 2, thus to take measurements for determining wheel caster adjustments;

FIG. 11 is a fragmentary isometric view showing the gauge housing and exterior of an alternative form of inclination gauge which may be employed with the structural elements and meter shown in FIG. 1 in place of the inclination gauge shown therein;

FIG. 12 is an elevational view taken along line 9—9 of FIG. 8, or with the front cover of the inclination gauge removed;

FIG. 13 is a transverse sectional elevational view, taken along line 13—13 of FIG. 12; and FIG. 14 is an enlarged scale, fragmentary elevational view of the leaf spring, its strain gauge strips and circuitry, shown to smaller scale in FIG. 12.

Referring now in detail to the drawings in which like reference numerals are assigned to like elements in the various views, a camber gauge 10 is shown in FIG. 1 as including a gauge assembly 11 with frame or support 12 therefor, the support having a base block 13 on which is mounted the housing 14 for an inclination gauge 15, to be hereinbelow described in detail. The camber gauge 10 also includes a meter 16 which is connected by an amply long flexible extension, conductor cord 17, to the inclination gauge 15. Also, a second flexible extension, conductor cord 18 extends from the meter 16 and terminates in a plug insert 19 to be plugged into an outlet from an alternating current power source, not indicated in FIG. 1.

The meter 16 presents to view a visual indicia 20 including a dial 21 graduated in 5 degrees of camber, and a reflecting pointer 22. Also, the meter view discloses a switch lever 23 to be turned to close or open circuit from the source of power, a zeroing or adjustment knob 24, and a conventional calibration post or stud assembly 25, to be hereinbelow described in function. Also, assembly screws 26 are shown by which the cover 27 of the meter is assembled with the body or housing 28.

The frame or support 12 includes a post 29 which upstands from the base block 13 and has an adjustable arm 30 slidably mounted thereon, the arm 30 including a sleeve part 31 slidable upon the post 29, with a set screw 32 having its shank threadable through the sleeve 31 to bear upon the post 29, thus to fix the arm in selected position with relation to the inclination gauge 15. The arm 30 includes a connection plate or gusset 33 which extends outwardly from the sleeve 31 with the longitudinal axis of the plate part 33 substantially perpendicular to the sleeve axis. From the outer end of the plate part 33, a finger block support part 34 extends angularly upwardly to have a finger block 35 mounted with longitudinal axis crossing its upper end, thus to provide a vertical plane surface 39a at a predetermined spaced horizontal distance from a plane including the vertical axis of the post 29. A rod or finger 36a extends from the finger block 35 for a predetermined distance, and with axis perpendicular to the axis of the post 29.

From the base block 13 there also extends a finger bar support rod 37 with axis perpendicular to the axis of the post 29, and mounts across its outer end a finger carrying cross-bar 38 with longitudinal axis perpendicular to the axis of the support rod 37 and providing a plane surface 39b in a plane which includes the upper finger block surface 39a, such plane surface 39a thus being at a predetermined spaced horizontal distance from a plane including the axis of the post 29, as aforesaid. As shown in FIG. 1, rods or fingers 36b, 36c extend from opposite ends of the cross-bar 38 with respective axes parallel to, and equidistant from, the axis of the support rod 37.

The lower, outer corner of the connection plate 33 has a bore 40 therethrough through which an end of a substantially tensioned spring 41 may be connected, the other end of the spring 41 being connected to a magnetic block, or to a structure presenting a flat, magnetic surface 42.

As is well known, camber is the wheel tilt from vertical when viewed from the front, the camber being positive when the upper part of the wheel or the upper part of its rim tilt outwardly about a horizontal axis parallel to the longitudinal axis of the vehicle, as shown in FIG. 2. In this case, the angle N is the angle of positive camber, as a plane P, including the flat surfaces 39a, 39b of the respective upper and lower finger blocks 35, 38, has pivoted about a horizontal fore and aft axis, best seen in FIG. 3, and indicated by a point X in FIG. 2. Thus the longitudinal axis of vehicle should be parallel to this axis X.

A plane P is indicated upwardly in FIG. 2 as passing through the abutment of the outer, annular rim face 47 of the rim 43, with the flat surface 39a of the upper finger block 35. Also, therebelow in FIG. 2, such plane P is shown passing through the abutment of the aforesaid rim face 47 with the flat surface 39b of the finger cross-bar 38. And further, the plane P is indicated in FIG. 4 as passing through the abutment of the rim face 47 of the rim 43 with the flat surface 39a of the upper finger block 35, as aforesaid. As best indicated in FIG. 3, the plane P passes through an upper area of contact 46a, and two spaced apart lower areas of contact 46b, 46c, with the rim face 47. As best illustrated in FIG. 3, the disposition of the finger support cross-bar 38 therebelow, and symmetrically disposed about a vertical center line through the wheel, results in a symmetrical disposition of the fingers 36a, 36b and 36c. Then, since the arm 30 is disposed at a calculated predetermined elevation on the post 29 above the axis of the support bar or rod 37, the resulting disposition of the fingers 36a, 36b and 36c being such as to establish three point contact with the inner peripheral surface 48 of the rim 43.

The three point contact of the fingers 36a, 36b, 36c with the inner periphery 48 of the rim 43, on which the tire 44 is installed, together with the contact of the rim areas 46a, 46b and 46 with the respective finger blocks 35, 38, results in such engagement between the wheel 50 and the gauge assembly 11, that only slight force is necessary to hold the gauge assembly 11 positively in proper position on the wheel 50. This force is supplied in the form of the magnet 42 and the spring 41 attached thereto, the magnet being positioned to adhere to a ferrous metal surface substantially centrally of the wheel 50, as the rim surface 45, adjacent the axle 51, as shown in FIG. 3, while the spring 41 thus urges or draws the gauge assembly 11, from a point of substantial central connection in the bore 40, toward or against the rim 43.

Referring now to FIGS. 5, 6 and 7, when considered together with FIG. 1, the inclination gauge 15 includes, within the gauge housing 14, a liquid 53 enclosed and sealed within a glass capsule 54 to partially fill it. The liquid is of the type termed an electrolyte, and salt water, diluted acetic acid, ammonium acetate, or ammonium chloride, and similar liquids, alone or in combinations, may also serve for this purpose. Left, center and right electrodes A, B and C, equally spaced apart and substantially symmetrically disposed within the capsule 54, base against the inner surface of the capsule at the bottom of the liquid, and extend upwardly, sealably through the upper part of the capsule 54, to terminate thereabove. The capsule 54 is rigidly embedded in an adhesive 49 which anchors it to the base plate 52 of the gauge housing 14, which in turn rests upon the base block 13 shown in FIG. 1.

The capsule 54 is disposed in the gauge housing 14 in a manner that an upright plane passing through the longitudinal axis of the capsule is perpendicular to a fore and aft, upright plane, as one that includes the axis of the post 29 and is parallel with the plane P when the gauge assembly 11 is mounted on a wheel 50, as hereinabove described. Thus, if a wheel to be measured has positive camber N, as indicated in FIG. 2, the capsule 54 is tilted at an angle N from the horizontal, as shown in FIG. 6, which is equal to the angle of tilt or camber of the wheel 50 shown in FIG. 2. Then, since the liquid 53 seeks a horizontal surface level, the electrode A is substantially emersed, the electrode B is emersed to lesser degree, and the electrode C is emersed to still lesser degree, as shown in FIG. 6. Under the above described conditions, the relative impedance between the electrodes A and B and between the electrodes B and C will be *inversely* proportionate to the average of the cross-sectional areas of the liquid therebetween, the total cross-sectional areas across the capsule at any plane (liquid area plus free area) being constant.

Thus, should the electrode B be included in circuitry in manner that it corresponds with one of the Wheatstone bridge terminals to which an input conductor is connected, the respective paths between the aforesaid electrodes will correspond with elements (usually resistors) in the legs of a Wheatstone bridge with adjacent ends connected to such terminal. Thus, with the conductor 59 shown in FIGS. 5 and 6 corresponding with the aforesaid input conductor, when the capsule 54 is tilted, as shown in FIG. 6, the impedance is greater and the AC voltage is greater between the electrodes B and C than the impedance and AC voltage between the electrodes A and B.

The circuitry diagram of FIG. 7 discloses circuits involved with the inclination gauge 15, the flexible electrical conductor cord 17 to the meter, the meter 16, and the flexible electrical conductor cord 18 to the source of power. The plug insert 19 of the cord 18 is plugged into a source of alternating current G1 from which extend the input conductors 58 and 59. The input conductor 59 extends through the conductor cord 18 to the meter 16, and includes within the meter 16 a current limiting resistor R1. Within the meter 16 the conductor 59 is connected to a terminal H, to be hereinbelow described, and thence the conductor 59 extends through the cord 17 to the aforesaid terminal of the central electrode B.

The input conductor 58 extends through the conductor cord 18 to the meter 16, and therein to the control shaft or pointer of a potentiometer 24 of which the knob designated 24 in FIG. 1 comprises the control actuator. The pointer of the potentiometer 24 extends radially from its control shaft and establishes the variably disposed terminal of the portion of the aforesaid Wheatstone bridge within the meter 16, and distributes the resistance of the resistor R5 in manner that the reading of the meter indicia 20 may be changed in adjustment or in operation.

The input conductor 58 extends to the meter 16, and includes, within the meter, a switch S1, the lever 23 thereof being shown in FIG. 1 as accessible at the top of the meter. Also, the calibration post or stud 25, shown on top of the meter 16 in FIG. 1, is threadably adjustable to calibrate a rheostat R2, included in the circuit of the conductor 58, thus to vary the voltage to be impressed across the Wheatstone bridge, and thereby to calibrate the readings of the meter indicia 20 in degrees to correspond with the actual degrees of tilt of the gauge assembly parts, including the capsule 54, when the gauge assembly 11 is attached to a wheel 50 to be measured for camber.

A conductor 57 extends across the two AC input or power conductors, from the conductor 58 inwardly of the switch S1 within the meter 16, to the post or terminal H therein to which the input conductor 59 is connected, as aforesaid. A Zener diode D1 is included in the conductor 57 for the purpose of reducing the conventionally fluctuating AC voltage to a predetermined constant AC voltage, say 12 volts. Such Zener diode D1 reduces the amplitude of the AC waves ("squaring them off" at the predetermined voltage) and additionally serves to prevent polarization of the liquid 53 within the capsule 54.

The conductors 60 and 61, from the respective electrode terminals A and C within the gauge housing 14, extend through the conductor cord 17 from the inclination gauge to the meter 16, and there connect to the respective Wheatstone bridge output terminals E and F. From these terminals or posts E and F, the respective conductors 60 and 61, in capacities of legs of the Wheatstone bridge, extend to opposite ends of the aforesaid resistor R5, and include therein the respective conventional Wheatstone bridge equal resistors R3 and R4.

The meter indicia circuitry includes conductors 62 and 63 from the respective posts or terminals E and F, which have the respective DC rectifiers D2 and D3 therein, and which connect to the respective posts or terminals J and K on opposite sides of the meter indicia circuitry 20. From the terminal J a conductor 64a extends to connect to the left or negative camber reading side of the meter M1, and from the right or positive reading side of the meter M1 a conductor 64b extends to the terminal K. Also, from the terminal J a conductor 65 extends to the terminal H, and includes the capacitor C1 therein, and from the terminal H a conductor 66 extends to the terminal K and includes the capacitor C2 therein. A resistor R6 is installed across the conductors 64a, 65 on the left or negative reading side of the meter circuitry, and a resistor R7 is installed across the conductors 64b, 65 on the right or positive reading side of the meter circuitry, for purposes to be hereinbelow described.

Having described the circuitry disclosed in FIG. 7 in detail, its functioning may be readily understood, as hereinbelow set forth. With the capsule 54 tilted at an angle to the horizontal corresponding with the positive camber angle N at which the wheel 50 shown in FIG. 2 is tilted, the voltage across A, 60, E, R3 to R5 is less than the voltage across C, 61, F, R4 to R5, with the consequence that the rectified DC voltage passed by the rectifier D3 is greater than the rectified voltage passed by the rectifier D2.

Thus the capacitor C2 is charged to a higher capacity than the capacitor C1. This difference in potential thus results in the DC current flowing in direction to deflect the pointer to the right, as indicated in FIG. 7 and in FIG. 1, the degree of deflection when the meter has been properly calibrated, being in direct linear proportion to the angle N shown in FIGS. 2 and 6. This reading is thus termed the camber angle, positive in the case illustrated.

The pointer 22 will remain deflected to indicate the measured camber as long as the gauge assembly 11 is installed on the wheel 50, as shown in FIG. 2. Then, when the gauge assembly 11 is removed, thus to effect a change in the angle N, as when the device may be placed with the base block 13 supporting the assembly with the post 29 upright, the electrolyte 53 levels off with surface horizontal, the DC voltage being relieved as the capacitors C1 and C2 discharge through the respective resistors R6 and R7, the pointer 22 returning to a zero reading.

Referring now to FIGS. 8, 9, and 10, it is well known that the caster angle in an automobile is the angle between the axis between the spindle-support arm 67, and a vertical, transverse plane T including an axle axis Y. In the view of FIG. 8, the caster angle Q is positive since the upper part of the spindle-support arm 67 above the transverse axis extends to the rear of the aforesaid transverse, vertical plane T. Caster may also be negative, dependent upon the make of automobile, usages, and the tendency for which correction is best suggested. Negative caster reduces directional stability but offers easier steering, improves parking ease, and minimizes road shock. Positive caster tends to keep the front wheels straight, and makes it easier to straighten out the wheels after a turn. In FIG. 8 the suspension arm 68 which suspends the frame 70 shown in FIG. 2 from the axle, not shown, of the wheel 50. Also, the wheel 50 shown in FIG. 2.

In practicing the methods of this invention, the whole automobile is first elevated to give access to a mechanic therebeneath so that he may work inside of, and from below each wheel to be adjusted. His work will first include straightening or changing the camber angle N, as by adjusting the mechanical means between the suspension arm 68 and the wheel axle.

After first adjusting a wheel from below to arrive at the proper predetermined angle of camber, the mechanic then has the task of straightening or changing the caster angle Q, as by adjusting mechanically the relationship of the support arm 67 with relation to the parts of the frame 70, and with relation of the suspension arm 68 as it connects mechanically with the axle of the wheel 50.

The extension cord 17 is of such length that it can easily reach with slack from an inclination gauge on a wheel to the area in which a mechanic stands to make wheel adjustments, the meter 16 being disposed adjacent the mechanic's working position, where it is visible as he makes adjustments.

As a feature of adaptation, a magnet 69, shown in dotted lines in FIG. 1, may be affixed beneath the meter 16 to adhere to a convenient metal part adjacent the work, and also, a sponge rubber support 71 may be installed around the lower part of the meter 16, the sponge rubber 71 being thicker in depth than the distance the magnet 69 extends below the bottom of the meter 16. Thus, when the magnet 69 adheres to a metal part underneath the automobile, the sprongs rubber 71 will be compressed, thus to provide a firmly seated cushion for the meter 16.

As the mechanic adjusts the connection between the suspension arm 17 and the wheel axle related parts, he observes the meter and directs his adjustments accordingly, until the meter indicia 20 indicates that the desired predetermined camber angle N has been achieved or restored.

To measure caster, the wheel 50 is rotated 22½ degrees, as to turn left, as shown in FIG. 9, and the meter reading observed. This reading will be the camber reading and one-fourth of the caster reading added algebraically. Then the meter reading is adjusted to zero by manipulation of the knob 24. The wheel 50 is then rotated 45 degrees (to the right) from the position shown in FIG. 9 (as to turn right), and the change of the pointer 22 from zero, and the direction, positive or negative), in which the pointer moves, indicates one-half the caster, and the direction (positive or negative) thereof. The simple mental step of multiplying this last pointer indication by two, arrives at the measured caster angle. The mechanic may thus observe and make this multiplication, and/or successively observe, each time making this multiplication, and, by making adjustments each time in direction indicated, the proper caster angle can be achieved or restored.

As shown in FIGS. 11–14, inclusive, another form of inclination gauge 15a is substituted for the inclination gauge 15 shown in FIG. 1. Such a gauge includes a cylindrical housing 14a mounted on a base block 13a, substantially as the base block 13 shown in FIG. 1. The housing cylinder 72 has a recess 73 in the upper part thereof in which is suspended a leaf spring 74, as by means of a machine screw 75 which connects the upper end of the leaf spring 74 to the cylinder 72. A weight or plumb bob 76 has a recess 77 in the upper end thereof to receive the lower end of the leaf spring 74 therein, the plumb bob or weight 76 being suspended by means of its connection to the lower end of the leaf spring 74 by means of a machine screw 78.

The leaf spring 74 has a "strain" gauge 80 mounted thereon in the form of two parallel, longitudinally extending, substantially pure, crystalline silicon strips 79a, 79b, the strip 79a on the right in FIG. 14 being of wider dimension than the strip 79b on the left, and the strips having respective impurities in minute degree introduced thereinto which effect their electrical characteristics. Thus the strips 79a has its resistance increased when placed under increased tension, while the strip 79b has its resistance decreased when placed under increased tension. As shown in FIG. 14, the lower ends of the strips 79a and 79b are connected electrically to a central electrode equivalent B' from which the conductor 59 extends through the conductor 17 to a meter 16, as shown in FIG. 7.

Also, the upper ends of the strips 79a, 79b are connected electrically to respective electrode equivalents C', A' from which extend respective conductors 61, 60 to pass through the conductor 17 to the aforesaid meter 16. Thus, when the camber is positive, as indicated by the tilt of the gauge housing 14a in FIG. 13, the weight 76 hangs in direction to place the strips 79a, 79b slightly to compression with the ultimate consequence that the voltage across A', by way of the conductor 60 to the post E shown in FIG. 7, and thence by way of the resistor R3 to R5 is less than the voltage across C', by way of the conductor 61 to the post F shown in FIG. 7, and thence by by way of the resistor R4 to R5.

The form of the invention using the "strain" gauge strips is thus seen to be the equivalent of the type using the electrolyte 53 in function but this type of gauge has a wider linear range of application, the electrolyte type of gauge, on the other hand, being better protected from damage in handling, and not so easily thrown out of adjustment.

The invention, in essence, sets out to provide a camber gauge for vehicle wheels which may remain on a wheel while transmitting readings to a meter adjacent the mechanic, the readings being observable and followed to dictate the degree and direction of successive adjustments. It can thus be seen that a range of inclination gauging means may serve as long as such automatically remains on the wheel being adjusted. Also, a variety of meter structures may serve as long as they can be disposed in easy view of the mechanic below the wheel under adjustment, and can accurately transmit readings linearly in correspondence with the camber angle.

Thus the invention is not limited to any particular inclination gauge, gauge assembly, or meter, as long as such fall within the broad spirit of the invention, and within the broad scope of interpretation claimed for, and merited by, the appended claims.

What is claimed is:
1. A camber gauge for rimmed vehicle wheels comprising support means carrying contact finger means positionable to establish in excess of two point contact with the rim face in the plane of camber and with the inner periphery of the rim, magnetic means attachable to the wheel substantially centrally thereof, and resilient means connecting said magnet means and said support means to urge said support means toward said wheel, said support means also including an inclination gauge with circuitry and carried by said support means to reflect camber angle, meter means adapted to linearly reflect camber angle as imparted thereto, and including meter means circuitry, a first extension cord connecting said inclination gauge circuitry and meter means circuitry, and a second extension cord connecting said meter circuitry to a source of alternating current power, whereby said contact finger means may be held automatically in plane of camber contact with a wheel rim while said meter may be disposed adjacent said wheel for a mechanic therebelow to observe camber reflected thereto while the mechanic makes successively suggested adjustments.

2. A camber gauge as claimed in claim 1 in which said inclination gauge and circuitry include a strain gauge and comprise two adjacent legs of a Wheatstone bridge, and in which the other two legs of the Wheatstone bridge are included in said meter circuitry.

3. A camber gauge as claimed in claim 1 in which said inclination gauge and circuitry include a capsuled electrolyte and comprise two adjacent legs of a Wheatstone bridge, and in which the other two legs of the Wheatstone bridge are included in said meter circuitry.

4. A camber gauge as claimed in claim 1 in which said meter includes magnetic means to hold it in visible position adjacent wheel adjusting position.

5. A camber gauge as claimed in claim 1 in which said support means includes an arm adjustable in elevation and carrying part of said contact finger means and to which said resilient means is connected.

References Cited

UNITED STATES PATENTS

| | | | |
|---|---|---|---|
| 2,562,142 | 7/1951 | Frazee | 33—203.18 |
| 2,577,841 | 12/1951 | Creagmile | 33—203.18 |
| 2,765,540 | 10/1956 | MacMillan et al. | 33—203.18 |
| 2,953,857 | 9/1960 | Mineck | 33—203.12 |

FOREIGN PATENTS 130,331  11/1948  Australia.

WILLIAM D. MARTIN, JR., *Primary Examiner.*